US006993149B2

(12) United States Patent
Brunk et al.

(10) Patent No.: US 6,993,149 B2
(45) Date of Patent: Jan. 31, 2006

(54) EMBEDDING DIGITAL WATERMARKS IN SPOT COLORS

(75) Inventors: Hugh L. Brunk, Portland, OR (US); Osama M. Alattar, Tigard, OR (US)

(73) Assignee: Digimarc Corporation, Beaverton, OR (US)

(*) Notice: Subject to any disclaimer, the term of this patent is extended or adjusted under 35 U.S.C. 154(b) by 725 days.

(21) Appl. No.: 09/963,344

(22) Filed: Sep. 25, 2001

(65) Prior Publication Data

US 2003/0058477 A1 Mar. 27, 2003

(51) Int. Cl.
*G06K 9/00* (2006.01)

(52) U.S. Cl. ..................... 382/100; 382/162
(58) Field of Classification Search ............ 382/100, 382/135–139, 162–167; 345/3.28, 3.3; 358/2.1, 358/452
See application file for complete search history.

(56) References Cited

U.S. PATENT DOCUMENTS

| 5,051,835 | A |   | 9/1991  | Bruehl et al. ........... 386/4    |
|-----------|---|---|---------|-----------------------------------|
| 5,062,360 | A |   | 11/1991 | Germann et al. ........ 101/152   |
| 5,075,787 | A | * | 12/1991 | Shaughnessy et al. ... 358/452    |
| 5,216,724 | A |   | 6/1993  | Suzuki et al. ........... 382/135 |
| 5,315,416 | A |   | 5/1994  | Taniuchi et al. ......... 358/537 |
| 5,321,470 | A |   | 6/1994  | Hasuo et al. ............ 399/365 |
| 5,349,648 | A |   | 9/1994  | Handley ................. 715/517  |
| 5,363,202 | A |   | 11/1994 | Udagawa et al. ........ 358/501  |
| 5,363,212 | A |   | 11/1994 | Taniuchi et al. ......... 358/452 |
| 5,467,581 | A |   | 11/1995 | Everette ................ 53/133.2 |
| 5,521,722 | A |   | 5/1996  | Colvill et al. ........... 358/500 |
| 5,530,751 | A |   | 6/1996  | Morris ................... 380/202  |
| 5,530,759 | A |   | 6/1996  | Braudaway .............. 380/54    |
| 5,544,255 | A |   | 8/1996  | Smithies et al. ......... 382/119 |
| 5,568,555 | A |   | 10/1996 | Shamir .................. 380/51   |
| 5,617,119 | A |   | 4/1997  | Briggs ................... 707/100  |
| 5,636,292 | A |   | 6/1997  | Rhoads .................. 382/232   |
| 5,646,997 | A |   | 7/1997  | Barton ................... 713/176  |
| 5,652,626 | A |   | 7/1997  | Kawakami et al. ....... 348/473  |
| 5,659,726 | A |   | 8/1997  | Sandford, II et al. ... 707/101   |
| 5,684,885 | A | * | 11/1997 | Cass et al. .............. 382/100  |
| 5,687,236 | A |   | 11/1997 | Moskowitz ............. 380/28    |
| 5,689,623 | A |   | 11/1997 | Pinnard ................. 358/1.6   |
| 5,721,788 | A |   | 2/1998  | Powell et al. ........... 382/100  |
| 5,724,425 | A |   | 3/1998  | Chang et al. ............ 705/52   |

(Continued)

FOREIGN PATENT DOCUMENTS

EP          1137244          9/2001

(Continued)

OTHER PUBLICATIONS

Alattar, "Watermarking Spot Colors", Proceedings of SPIE-IS&T Electronic Imaging, SPIE vol. 5020, 2003.*

(Continued)

*Primary Examiner*—Jose L. Couso
*Assistant Examiner*—Tom Y. Lu
(74) *Attorney, Agent, or Firm*—Digimarc Corporation

(57) ABSTRACT

The present invention relates to digitally watermarking spot color images. In one embodiment, an original spot color is replaced with a combination of cyan (C), magenta (M) and yellow (Y) components and the original spot color. The CMY components convey a digital watermark. Preferably, a large percentage halftone process screens the spot color. This screened spot color is combined with the CMY components. Combining the CMY components with a large percentage halftone screening results in a watermarked image color that closely approximates to the original spot color. In another embodiment, a spot color is halftone-screened to a percentage of its original intensity. The screened-back spot color is modulated to accommodate a watermark signal.

28 Claims, 5 Drawing Sheets

U.S. PATENT DOCUMENTS

| | | | |
|---|---|---|---|
| 5,735,547 A | 4/1998 | Morelle et al. | 283/67 |
| 5,809,139 A | 9/1998 | Girod | 380/202 |
| 5,819,289 A | 10/1998 | Sanford, II et al. | 707/100 |
| 5,825,892 A | 10/1998 | Braudaway et al. | 380/51 |
| 5,862,218 A | 1/1999 | Steinberg | 713/176 |
| 5,862,260 A | 1/1999 | Rhoads | 382/232 |
| 5,875,249 A | 2/1999 | Mintzer et al. | 380/54 |
| 5,893,101 A | 4/1999 | Balogh et al. | 707/100 |
| 5,905,800 A | 5/1999 | Moskowitz et al. | 380/28 |
| 5,915,027 A | 6/1999 | Cox | 380/54 |
| 5,919,730 A | 7/1999 | Gasper et al. | 503/201 |
| 5,930,369 A | 7/1999 | Cox | 380/54 |
| 5,933,798 A | 8/1999 | Linnartz | 702/191 |
| 5,935,755 A | 8/1999 | Kazmaier et al. | 430/120 |
| 5,946,103 A * | 8/1999 | Curry | 358/3.28 |
| 5,946,414 A * | 8/1999 | Cass et al. | 382/183 |
| 5,949,055 A | 9/1999 | Fleet et al. | 235/469 |
| 5,960,081 A | 9/1999 | Vynne et al. | 713/176 |
| 5,974,548 A | 10/1999 | Adams | 713/200 |
| 6,023,525 A * | 2/2000 | Cass | 382/162 |
| 6,104,812 A | 8/2000 | Koltai et al. | 380/51 |
| 6,122,403 A | 9/2000 | Rhoads | 382/233 |
| 6,185,312 B1 | 2/2001 | Nakamura et al. | 382/100 |
| 6,239,818 B1 | 5/2001 | Yoda | 347/143 |
| 6,246,777 B1 | 6/2001 | Agarwal et al. | 382/100 |
| 6,297,508 B1 | 10/2001 | Barmore et al. | 250/459.1 |
| 6,304,345 B1 | 10/2001 | Patton et al. | 358/527 |
| 6,320,675 B1 | 11/2001 | Sakaki et al. | 358/1.9 |
| 6,332,031 B1 | 12/2001 | Rhoads et al. | 382/100 |
| 6,334,187 B1 | 12/2001 | Kadono | 713/176 |
| 6,345,104 B1 | 2/2002 | Rhoads | 382/100 |
| 6,356,363 B1 | 3/2002 | Cooper et al. | 358/1.9 |
| 6,358,588 B1 * | 3/2002 | Edwards et al. | 428/42.2 |
| 6,385,329 B1 | 5/2002 | Sharma et al. | 382/60 |
| 6,404,926 B1 | 6/2002 | Miyahara et al. | 382/232 |
| 6,449,377 B1 | 9/2002 | Rhoads | 382/100 |
| 6,466,209 B1 | 10/2002 | Bantum | 345/589 |
| 6,535,617 B1 | 3/2003 | Hannigan et al. | 382/100 |
| 6,559,975 B1 | 5/2003 | Tolmer et al. | 358/1.9 |
| 6,577,744 B1 | 6/2003 | Braudaway et al. | 382/100 |
| 6,590,996 B1 | 7/2003 | Reed et al. | 382/100 |
| 6,614,914 B1 | 9/2003 | Rhoads et al. | 382/100 |
| 6,625,295 B1 | 9/2003 | Wolfgang et al. | 382/100 |
| 6,636,615 B1 | 10/2003 | Rhoads et al. | 382/100 |
| 6,665,095 B1 * | 12/2003 | Janssen et al. | 358/2.1 |
| 6,731,409 B2 * | 5/2004 | Wang | 358/3.28 |
| 2001/0030759 A1 | 10/2001 | Hayashi et al. | |
| 2001/0030761 A1 | 10/2001 | Ideyama | |
| 2001/0033674 A1 | 10/2001 | Chen et al. | |
| 2001/0037455 A1 | 11/2001 | Lawandy et al. | |
| 2001/0040980 A1 | 11/2001 | Yamaguchi | |
| 2001/0052076 A1 | 12/2001 | Kadono | |
| 2002/0009208 A1 | 1/2002 | Alattar et al. | |
| 2002/0012444 A1 | 1/2002 | Nishikawa et al. | |
| 2002/0018879 A1 | 2/2002 | Barnhart et al. | |
| 2002/0021824 A1 | 2/2002 | Reed et al. | |
| 2002/0023218 A1 | 2/2002 | Lawandy et al. | |
| 2002/0027612 A1 | 3/2002 | Brill et al. | |
| 2002/0031241 A1 | 3/2002 | Kawaguchi et al. | |
| 2002/0054356 A1 | 5/2002 | Kurita et al. | |
| 2002/0054680 A1 | 5/2002 | Huang et al. | |
| 2002/0067844 A1 | 6/2002 | Reed et al. | |
| 2002/0076086 A1 | 6/2002 | Yoshiura et al. | |
| 2002/0090112 A1 | 7/2002 | Reed et al. | |
| 2002/0101597 A1 | 8/2002 | Hoover | |
| 2002/0105679 A1 | 8/2002 | Haynes | |
| 2002/0118381 A1 | 8/2002 | Shirai et al. | |
| 2002/0120849 A1 | 8/2002 | McKinley et al. | |
| 2002/0126872 A1 | 9/2002 | Brunk et al. | |
| 2002/0163671 A1 | 11/2002 | Takaragi | |
| 2002/0164048 A1 | 11/2002 | Bruckstein et al. | |
| 2002/0164051 A1 | 11/2002 | Reed et al. | |
| 2002/0164052 A1 | 11/2002 | Reed et al. | |
| 2002/0168085 A1 | 11/2002 | Reed et al. | |
| 2003/0058477 A1 | 3/2003 | Brunk et al. | |
| 2003/0103645 A1 | 6/2003 | Levy et al. | |
| 2003/0187798 A1 | 10/2003 | McKinley et al. | |

FOREIGN PATENT DOCUMENTS

| | | |
|---|---|---|
| EP | 1209897 | 5/2002 |
| GB | 2360659 | 9/2001 |
| WO | WO9935819 | 7/1999 |
| WO | WO9953428 | 10/1999 |
| WO | WO0108405 | 2/2001 |
| WO | WO0219269 | 3/2002 |
| WO | WO0221846 | 3/2002 |
| WO | WO02087520 | 3/2002 |

OTHER PUBLICATIONS

U.S. Appl. No. 60/327,687, filed Oct. 5, 2001. McKinley et al.
U.S. Appl. No. 09/186,962, filed Nov. 5, 1998, Rhoads.
U.S. Appl. No. 09/503,881, filed Feb. 14, 2000, Rhoads et al.
U.S. Appl. No. 09/553,084, filed Apr. 19, 2000, Reed et al.
U.S. Appl. No. 09/689,226, filed Oct. 11, 2000, Brunk.
U.S. Appl. No. 09/694,465, filed Oct. 23, 2000, Rodriguez et al.
U.S. Appl. No. 09/963,344, filed Sep. 25, 2001, Brunk et al.
U.S. Appl. No. 10/074,677, filed Feb. 11, 2002, Alattar.
U.S. Appl. No. 10/209,053, filed Jul. 30, 2002, Reed.
Alattar, "'Smart Images' Using Digimarc's Watermarking Technology," IS&T/SPIE's 12$^{th}$ Symposium on Electronic Imaging, San Jose, CA, Jan. 25, 2000, vol. 3971, No. 25, 10 pages.
Battiato et al., "Robust Watermarking for Images Based on Color Manipulation," IH/99 LNCS 1768, pp. 302-317, 2000.
Berghel et al., "Protecting Ownership Rights Through Digital Watermarking," Computer, pp. 101-103, Jul. 1996.
Bors et al., "Image Watermarking Using DCT Domain Constraints," Image Processing, 1996, Proceedings, International Conference, vol. 3, 1996, pp. 231-234.
Dautzenberg, "Watermarking Images," Department of Microelectronics and Electrical Engineering, Trinity College Dublin, 47 pages, Oct. 1994.
Fleet et al., "Embedding Invisible Information in Color Images," Proc. Int. Conf. on Image Processing, vol. 1, pp. 532-535, Oct., 1997.
Jack, Chapter 3, "Color Spaces," Video Demystified—A Handbook for the Digital Engineer, 2d ed., HighText publications, pp 39-63.
ORuanaidh et al, "Watermarking Digital Images for Copyright Protection," Aug., 1996, IEEE Proceedings-Vision, Image and Signal Processing, vol. 143, No. 4, pp. 250-256.
Reed et al, "Adaptive Color Watermarking," Proc. SPIE, vol. 4675, pp. 222-229, 8 pages, Jan. 21, 2002.
Tian, "Wavelet-Based Reversible Watermarking for Authentication," Proc. SPIE—Int. Soc. Opt. Eng., vol. 4675, 2002, pp. 679-690.
Vidal, "Non-Noticeable Information Embedding in Color Images: Marking and Detection," 1999 IEEE, pp. 293-297.

* cited by examiner

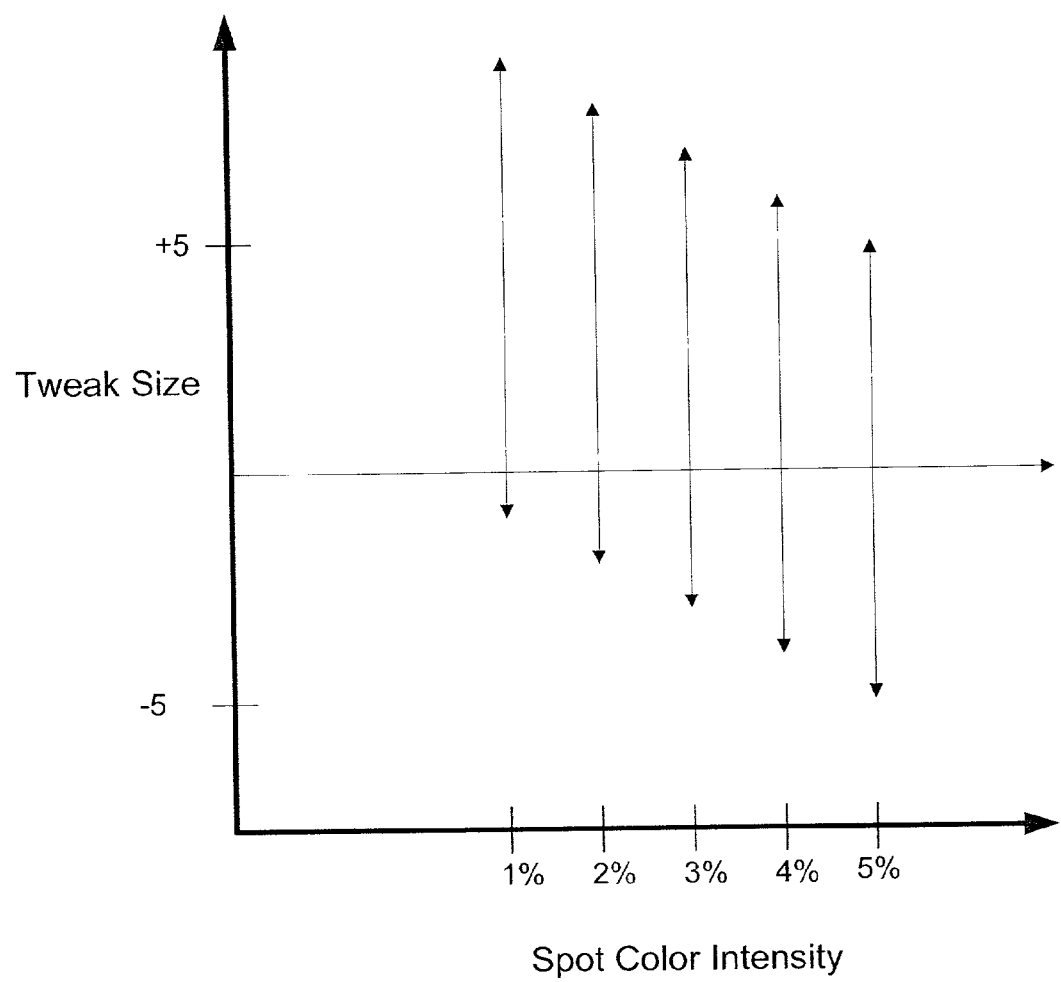

EMBEDDING DIGITAL WATERMARKS IN SPOT COLORS

RELATED APPLICATION DATA

This application is related to U.S. patent application Ser. No. 09/553,084, titled "Color Adaptive Watermarking," filed Apr. 19, 2000, (now U.S. Pat. No. 6,590,996), which is a continuation in part of U.S. patent application Ser. No. 09/503,881, filed Feb. 14, 2000, (now U.S. Pat. No. 6,614,914), which is a continuation in part of application Ser. No. 09/186,962, filed Nov. 5, 1998, which is a continuation of U.S. application Ser. No. 08/649,419, filed May 16, 1996, now U.S. Pat. No. 5,862,260.

FIELD OF THE INVENTION

The present invention relates to digital watermarking systems and methods, and is particularly illustrated with reference to digitally watermarking spot color media.

BACKGROUND AND SUMMARY OF THE INVENTION

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques involve varying the intensity or luminance of pixel colors. Of course there are many other digital watermarking techniques.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. U.S. patent application Ser. No. 09/503,881, filed Feb. 14, 2000, discloses various encoding and decoding techniques. U.S. Pat. Nos. 5,862,260 and 6,122,403 disclose still others. Of course, artisans know many other watermarking techniques.

One digital watermarking application involves watermarking print media such as magazine or newspaper advertisements, brochures, artwork, company logos, graphics, pictures and photographs, etc. In this case, a digital watermark is typically embedded in an image that is printed using a multi-color printing process. For example, the printing may include a cyan (C), magenta (M), yellow (Y) and black (K) process. CMYK ink intensities can be varied to modulate an image's luminance to accommodate a digital watermark signal. The individual CMYK values at a given image area (e.g., a pixel or other image area location) of an unmarked image can be represented as $(C_o, M_o, Y_o, K_o)$, and the individual values for the watermarked given area (or pixel) are $(C_m, M_m, Y_m, K_m)$. Each color quantity preferably represents an intensity percentage of the corresponding color ink. If the watermark signal requires a luminance change of $\alpha$ at this location, then:

$$(C_m, M_m, Y_m, K_m)=(C_o+\alpha\Delta C, M_o+\alpha\Delta M, Y_o+\alpha\Delta Y, K_o), \quad (1)$$

where $(\Delta C, \Delta M, \Delta Y)$ forms a scaling vector in CMY coordinates with a normalized projection onto a luminance axis. Different methods can be used to choose the direction of this scaling vector. For example, scaling may occur along a direction between white and an unmarked color, or scaling along the direction between black and the unmarked color. Consider FIGS. 1 and 2 for further illustration.

While the implementation details of watermark encoding schemes vary significantly, a class of watermarking schemes can be modeled as an array of changes to luminance values of a host image. A host image comprises an array of color vectors (e.g., an array of color such as RGB, CMY, CMYK, etc). The image sample may be represented as a vector between white and the pixel color value. To encode a watermark, the luminance of the image sample may be increased or decreased by adding a watermark vector in a variety of directions. This is because many possible watermark vectors have components along the luminance axis. Two useful directions for orienting the watermark vector are along a vector between black and the watermark color, and along a vector between white and the watermark vector. Using the former direction for the watermark vector is shown in FIG. 1. FIG. 1 shows a 3-dimensional color space with cyan (C), magenta (M) and yellow (Y) axes. The bold axis between black and white represents luminance. To make an equivalent luminance change in an image sample of a given color vector (C1, M1, Y1), one may make a corresponding scale to black as shown.

An alternative method of obtaining the same luminance change is to scale the image sample like a vector between white and the sample's color value as shown in FIG. 2. To make an equivalent luminance change, one may make a corresponding scale to white as shown. Of course a linear combination of these two scaling methods (white to color and black to color) can also be used to effect a luminance change.

By using the scale to white method for colors with high yellow content such as yellow, red and green, and scale to black for blue, cyan and magenta, a lower visibility watermark can be encoded with the same detectability.

Once the color vector entries are established, each of the entries is associated with a set of scale factors. The set includes a scale factor for each color component. The specific color components in the implementation depend on the color format of the image. For example, images in an RGB format have scale factors for each of the R, G and B color components. Similarly, images in a CMY format have scale factors for each of the C, M and Y components of each table entry.

Further reference for such scaling techniques may be made to previously mentioned U.S. patent application Ser. No. 09/553,084 (now U.S. Pat. No. 6,590,996).

In watermarking items such as product packaging, brochures, graphics, logos, labels, etc., sometimes an original printed image is rendered using "spot color" inks to reproduce a specific desired color. A spot color is a specific color ink, and in some cases may lie outside the CMYK (or CMY) printing gamut. A spot color can be halftone-screened (or filtered) to achieve various shades of the original spot color. Embedding a digital watermark in a spot color presents a unique set of problems—these are the problems the present invention addresses. One conventional approach often falls short of solving these problems. This conventional approach produces an approximation of the spot color image using only CMY or CMYK inks. A digital watermark signal is embedded through modulating (or changing) various CMYK pixel (or other image area) intensities. Since the original spot color may lie outside the CMYK gamut, this first approach can yield poor results.

The present invention provides various methods to effectively embed a digital watermark signal in a spot color. To watermark an original spot color in a first embodiment, the original spot color is replaced with a combination of spot color and process inks. For example, cyan (C), magenta (M) and yellow (Y) process components are modulated (e.g., intensity or luminance varied) to include a watermark signal. The CMY components are preferably combined with a halftone-screened (or scaled) version of the original spot color (e.g., a percentage of the original spot color intensity) to approximate the original spot color. Preferably, the resulting watermarked spot color approximation closely resembles the original spot color.

In a second embodiment, a spot color is "screened back" to some percentage of its original intensity (e.g., 95%). The watermark signal is added to the screened back spot color as intensity tweaks to modulate the spot color at various pixel locations. As a variation, a spot color is modulated in accordance with a predetermined level along a screening range of the spot color intensity. As another variation, a non-screened-back spot color (e.g., a spot color at 100% intensity) is negatively modulated at various pixel locations to accommodate a watermark signal.

The foregoing and other features and advantages of the present invention will be more readily apparent from the following detailed description, which proceeds with reference to the accompanying drawings.

BRIEF DESCRIPTION OF THE DRAWINGS

FIGS. 6a and 6b are a diagrams showing intensity tweaks at various screened-back spot color percentages.

DETAILED DESCRIPTION

Introduction

In image processing applications, it is sometimes useful to be able to alter the colors of an image while reducing the visibility of these changes. Image watermarking is one application where it is desirable to alter image samples to encode information in a manner that is readily recoverable by an automated process, yet substantially imperceptible to human visual perception. This is particularly relevant when watermarking spot colors.

Embedding in Spot Color Images

Figure 1:
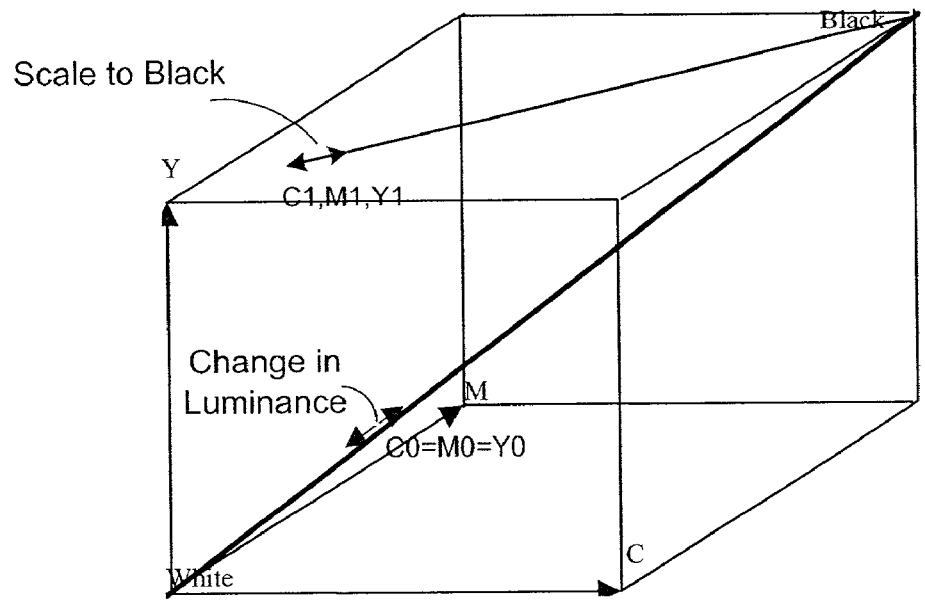
FIG. 1 is a diagram of a color space depicting how to scale a color vector to black to effect a change in luminance.
Figure 2:
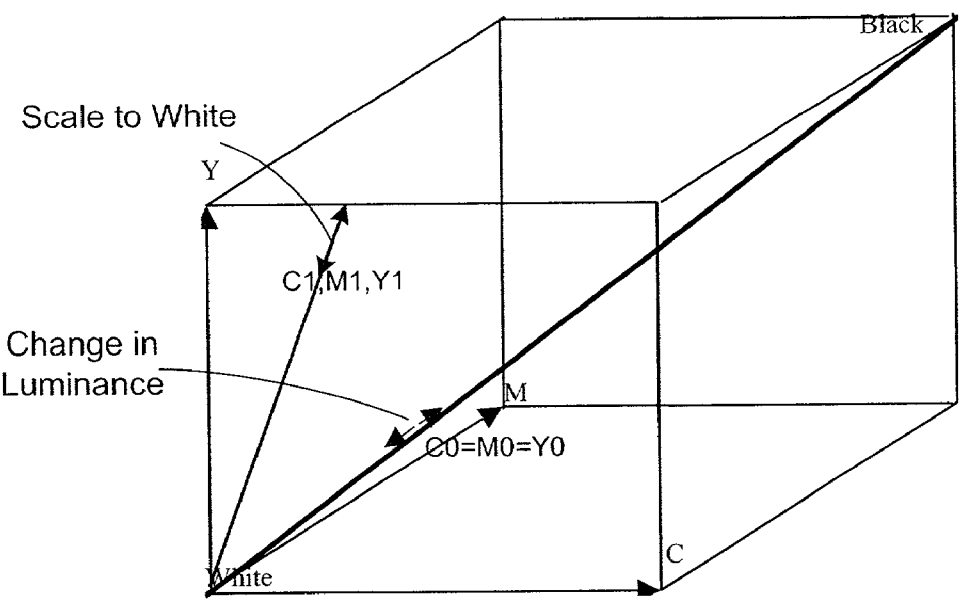
FIG. 2 is a diagram of a color space depicting how to scale a color vector to white to effect a change in luminance.
Figure 3:
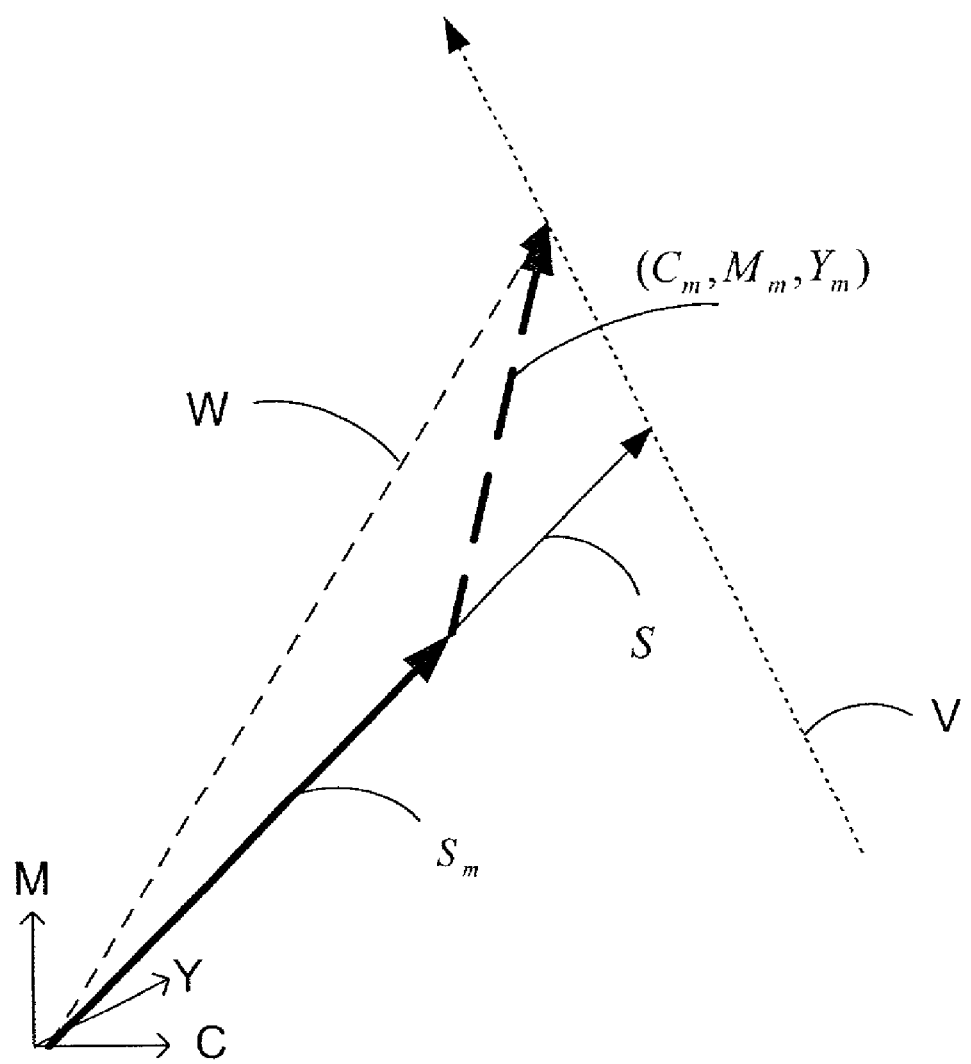
FIG. 3 is a diagram of a color space depicting the combination of a spot color with cyan, magenta and yellow components.

Our inventive methods are directed toward watermarking images printed with spot color inks. In a first embodiment, to embed a digital watermark in an original spot color (S), we replace the original spot color (S) with a combination of CMY inks ($C_m$, $M_m$, $Y_m$) and a scaled or halftone screened version ($S_m$) of the spot color (S). The screened spot color ($S_m$) is preferably a percentage of the original spot color (S) intensity (FIG. 3). We also refer to this process as "filling" or "filling-in" a spot color.

Figure 4:
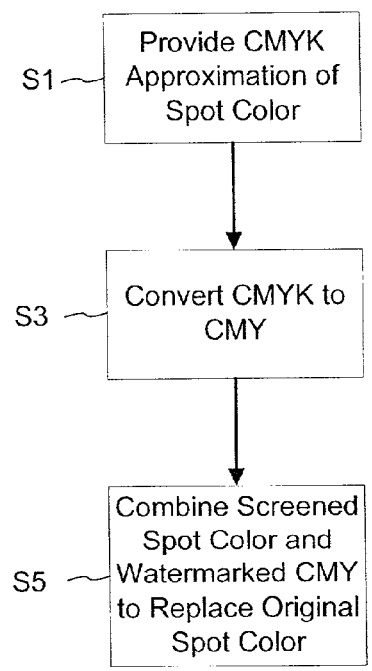
FIG. 4 is a flow diagram depicting an embedding method according to the present invention.

With reference to FIG. 4, for a given pixel (or other image area), a CMYK value is determined to approximate the original spot color (S), as shown in step S1. This CMYK approximation is preferably converted to a CMY approximation by a known black recombination equation or method (step S2). The resulting CMY approximation is represented as ($C_s$, $M_s$, $Y_s$).

An example of a recombination method is provided in Equation 2, below:

$$\beta = 0.01 \qquad (2)$$
$$C_s = C + K - \beta CK$$
$$M_s = M + K - \beta MK$$
$$Y_s = Y + K - \beta YK$$

Of course, the $\beta$ value can be varied without deviating from the scope of the present invention. Similarly, other known recombination techniques can be suitable interchanged with the present invention.

Alternatively, a CMY approximation is initially determined to approximate the original spot color (S), without first determining a CMYK approximation.

The CMY components are modulated (e.g., intensity or luminance varied) to accommodate a watermark signal. Of course, the modulation may be selective over an area—influencing only a subset of the area's locations. The screened spot color component $S_m$ and watermark carrying color components $C_m$, $M_m$ and $Y_m$ are combined ($S_m$, $C_m$, $M_m$, $Y_m$) to replace the original spot color (S) as in step S5. The resulting color W preferably closely approximates the original spot color S. (Each color component ($S_m$, $C_m$, $M_m$, $Y_m$) is preferably represented as an intensity percentage, or other measure, of its corresponding spot color or color processing ink.). For a CMY color space, a digitally watermarked pixel (or image area) is represented as a combination of four inks. This combination carries a watermark signal via the ($C_m$, $M_m$ and $Y_m$) channels. Such a combination also allows a luminance modulation-scaling vector (v in FIG. 3) to be oriented in multiple directions in the CMY color space.

The watermark carrying color components ($C_m$, $M_m$ and $Y_m$) preferably include a relationship between the spot color component $S_m$ and the CMY spot color approximation ($C_s$, $M_m$, $Y_m$). Ideally, the spot color component $S_m$ is as large as possible, while still being able to accommodate (e.g., add) the watermarked color components without significantly shifting the average color from the original spot color (S) intensity. Using the notation above for a CMY scaling vector, the CMY ink values can be related as:

$$C_m = (1 - S_m)C_s + \alpha\Delta C; \quad (3)$$
$$M_m = (1 - S_m)M_s + \alpha\Delta M; \text{ and}$$
$$Y_m = (1 - S_m)Y_s + \alpha\Delta Y,$$

where α represents a respective luminance change in a scaled (e.g., Δ) C, M or Y to accommodate the watermark signal. The combination of the spot color component term $(1-S_m)$ and the $C_s$, $M_s$ and $Y_s$ terms of the above equations (3) preferably result in a close approximation of the original spot color (S). Since the proportion of the screened spot color ($S_m$) to CMY is preferably large, this approximation is closer to the original spot color (S) than an approximation using only CMY or CMYK inks. The $\alpha\Delta C$, $\alpha\Delta M$ and $\alpha\Delta Y$ terms of the above equations (3) account for the watermark signal, which can lie along a desired scaling vector (v).

Now consider the following illustrative methods to help determine the amount (or percentage) of spot color ($S_m$) to combine with the CMY components (or percentages of components).

A first method considers each image point (e.g., a pixel or other image area). This method uses a maximum possible value of spot color ($S_m$) consistent with the above equations (3). The spot color value ($S_m$) is preferably chosen to render one of the CMY values ($C_m$, $M_m$, $Y_m$) equal to (or near) zero, if possible. If this is not possible, then the spot color ($S_m$) is preferably set to 100% of the original spot color (S) intensity for that image point. The following equation may be used to select a screened spot color $S_m$ value to achieve a zero $C_m$, $M_m$ or $Y_m$ value:

$$S_m = \min \begin{bmatrix} \frac{\alpha\Delta C}{C_s} + 1 \\ \frac{\alpha\Delta M}{M_s} + 1 \\ \frac{\alpha\Delta Y}{Y_s} + 1 \\ 1 \end{bmatrix}. \quad (4)$$

The minimum value ("min") selected from equation 3 preferably renders at least one of $C_m$, $M_m$ and $Y_m$ zero. Note that the luminance change α may be positive or negative, and preferably ΔC, ΔM, ΔY are each negative (e.g., since adding ink reduces luminosity). A value for $S_m$ larger than the equation 3 value is preferably not used, since such a larger value would require at least one of the process ink values $C_m$, $M_m$, $Y_m$ to be negative.

A second method for determining a value for spot color intensity $S_m$ uses a fixed value for $S_m$ across a subject spot color area. This may be desirable because dot gain can make accurate signal modulation of the spot color difficult. Dot gain is a phenomenon, e.g., in which a printed ink spot on paper appears larger than a desired size. One cause of dot gain is ink soaking into paper. The reason for dot gain causing problems with spot color modulation is that the spot color value will be near 100%, where the dot gain characteristic is most nonlinear. A fixed value for spot color intensity can be chosen by calculating the value for $S_m$ (e.g., via the first $S_m$ determining method above) for some or all of the spot color pixels in a spot color area. A minimum value of these $S_m$ values is then preferably used as the fixed $S_m$.

A combination of CMY inks and the screened spot color ($S_m$) can be used to approximate an original spot color (S) while still providing a watermarked color (W in FIG. 3). In this regard, the spot color is "filled in" by a CMY (or CMYK) combination. The CMY luminance (or intensity) values can be modulated (or varied) to accommodate the watermark signal. In one embodiment, a large percentage halftone screening ($S_m$) of the original spot color ink (S) is used. This helps to keep the resulting watermarked image color as close to the original spot color (S) as possible, even if the original spot color is out of the CMYK process color gamut. The spot color (S) can be screened through a conventional halftoning process to effectively reduce the intensity of the spot color (S). The combination of the screened spot color ($S_m$) and CMY color components can then be printed, e.g., with the aid of a halftoning process or other printing process. Examples of suitable halftoning techniques include ordered dither (both clustered and diffused dot), error diffusion, and blue noise masking, among other techniques.

Not all printing processes accommodate both spot color inks and CMY (or CMYK) process printing inks. Indeed, adding additional CMY printing plates to a spot color printing process may, in some cases, increase printing costs and complicate the overall printing process.

Accordingly, we have developed a second embodiment in which part or all of an original spot color is screened back, e.g., using one of the halftoning techniques mentioned above. This method focuses on manipulating the original spot color instead of supplementing or filling in the spot color with CMY or CMYK process inks.

Figure 5:
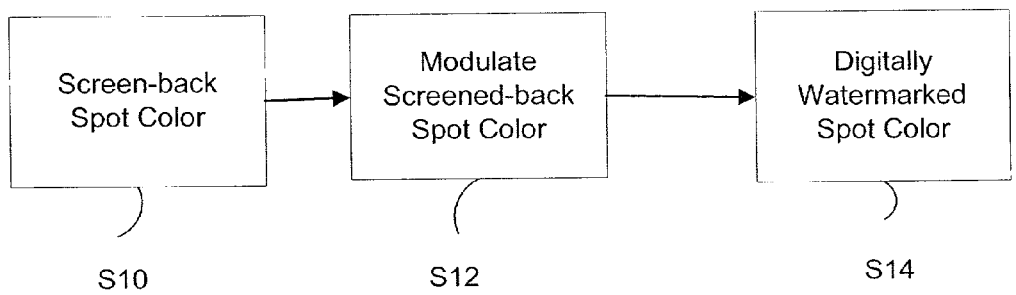
FIG. 5 is a flow diagram depicting a screened-back spot color embedding method.

With reference to FIG. 5, an original spot color is screened back to a percentage of its original intensity (S10). Most often this screening back process is accomplished in a digital domain, in which the spot color is represented as an intensity percentage or as a color level. Of course physical screening processes are well known as well. The intensities (or luminance) at various image areas in the screened-back spot color are modulated (or varied) to embed positive and/or negative watermark signal components therein (S12). For example, an intensity percentage can be shifted up or down (e.g., "tweaked") to accommodate a watermark signal component at a given image area (or pixel). In one case, the watermark tweaks collectively have a zero mean, e.g., meaning that for every positive tweak there is a corresponding negative tweak. Or a watermark signal is embedded with negative tweaks (e.g., a negative "channel") and then repetitively embedded at corresponding image areas with positive tweaks (e.g., a positive "channel"). In other cases, the collective mean may be positive or negative in relation to the screened-back spot-color intensity. The resulting modulated spot color includes an embedded digital watermark signal (S14).

Figure 6A:
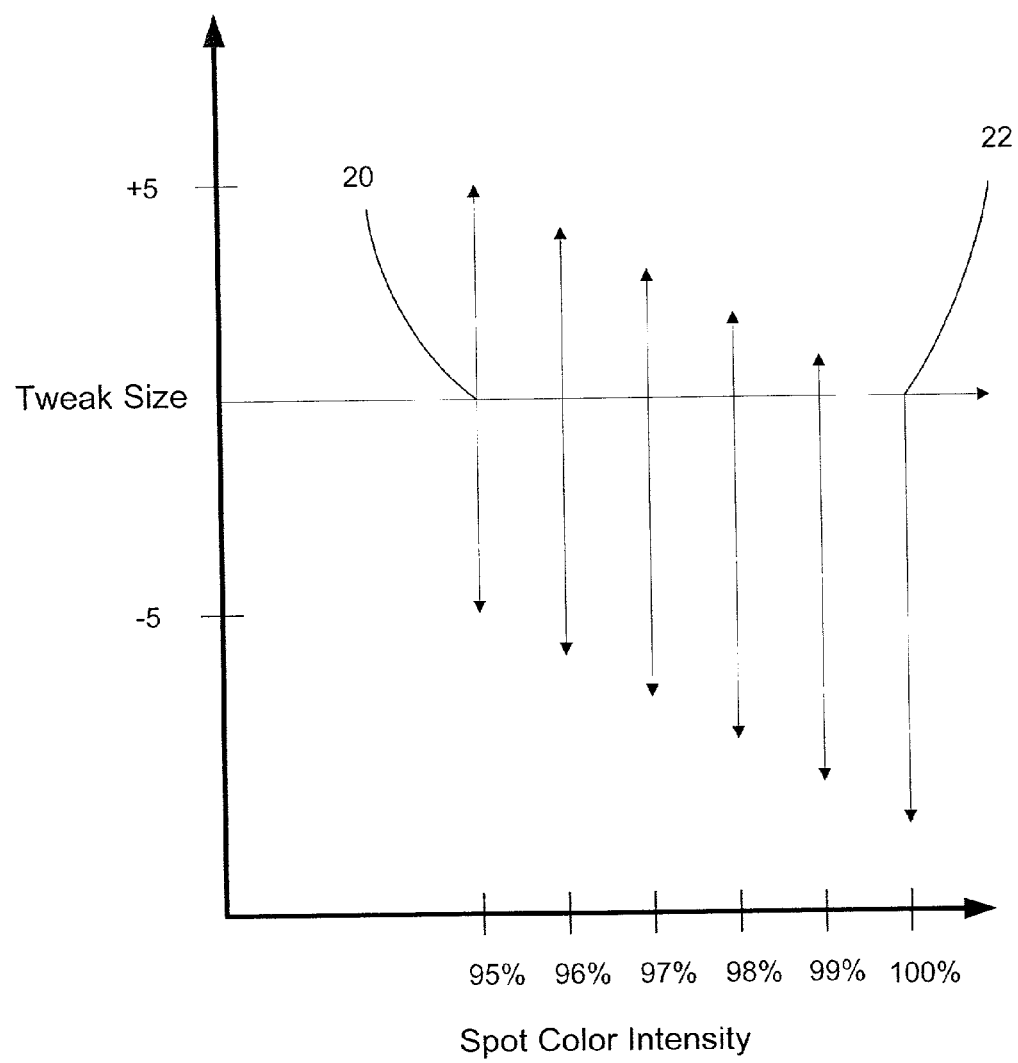

Now consider the graphs shown in FIGS. 6a and 6b, where spot color intensity, e.g., representing a percentage of an original or 100% spot color, is illustrated in relation to intensity tweak percentage size (vertical axis). A watermark signal is preferably embedded with a plurality of intensity tweaks arranged at various images areas (e.g., pixels or pixel blocks). Typically, such embedding results in one tweak per pixel or pixel area. At a 95% intensity level (20 in FIG. 6a) a maximum positive tweak size is 5%, raising the 95% intensity to 100% for a given pixel (or pixel block). To achieve a zero-mean watermark signal, a corresponding negative tweak size is 5%, lowering the 95% intensity to 90% at a corresponding pixel (or image area). Of course the positive tweak size at a 95% level can range in size from 1–5%, and a corresponding negative tweak preferably ranges in size from 1–20%.

At a 100% spot color intensity level (22), only a negative tweak is possible. Here, the spot color is not screened back. At the 100% level the range of negative tweaks preferably falls within a 1–20% size range. At level 22 a watermark's visibility may be affected since all tweaks are negative, e.g., resulting in a non-zero mean watermark signal. Moving away from the 100% level to lower screened-back intensities allows for both positive and negative tweaks.

Now consider an embodiment in which a watermark tweak "level" remains constant as spot color intensity percentages vary (e.g., from 100%–95%). A tweak level includes the sum of a negative and positive tweak size. For example, a 5% positive tweak size and a 5% negative tweak size result in a watermark tweak level of 10%. Or a 10% positive tweak size and a 10% negative tweak size result in a tweak level of 20%. Of course a tweak level can be determined to best suit a particular application, e.g., to accommodate factors such as watermark visibility and detectability. With reference to FIG. 6a, a tweak level of 10% preferably remains constant as spot color intensity varies from 100% to 95%. At the 99% intensity level, the positive tweak size is 1%, while the negative tweak size is 9%. And at the 98% intensity level the positive tweak size is 2%, while the negative tweak size is 8%, and so on. Maintaining a constant watermark tweak level allows for consistent application of a watermark signal across varying spot color intensities.

The idea of a constant tweak level helps to ensure a consistent ability to read the watermark. Other factors to consider include a dynamically calculated tweak size to produce a constant watermark level.

Another embedding factor is a spot color's ability to carry or hide a watermark signal. Our research has shown that a spot color's characteristics, e.g., a spot color's luminosity level, can influence the optimum watermark tweak level. Accordingly, the percentage tweak size can be established according to the spot color's luminosity.

Alternative methods are used to handle halftone-screened spot colors at a 94% intensity level and below. In a first alternative, a positive watermark tweak is adjusted to raise the total spot color percentage to 100%—6% at the 94% intensity level. The negative tweak can be adjusted at the 94% level to maintain a desired tweak level—4% if the tweak level is 10%. In a second alternative, the positive and negative tweak levels are capped at, e.g., 5%. At the 94% screened-back level the maximum spot color intensity at any pixel (or other image area) is then 99%.

With reference to FIG. 6b, a spot color is halftone-screened to yield a low intensity spot color, e.g., 1–5% of its original intensity. If a constant tweak level of 10% is desired, a 9% positive tweak size can be applied to a pixel with 1% intensity, or only a 1% negative tweak size would be allowable. Similarly, at a 2% intensity level, an 8% positive tweak size or a 2% negative tweak size is permitted.

Of course, other tweak levels can be determined, and, can vary from screened-back spot color percentage to percentage. For example, at a 99% level, the tweak level can be 10%, while at a 97% level the tweak level can be 13% (e.g., with a 10% negative tweak size) or so on.

A further advantage of the present invention is that the inventive spot color watermark is fragile. As will be appreciated, a fragile watermark is destroyed or degrades predictably with signal processing, e.g., scanning/copying, compression, etc. For example, a typical counterfeiting attempt will scan a watermarked spot color with an RGB scanner. The spot color and CMY components (if any) are converted into RGB, which typically distorts the spot color quality and CMY components—particularly when the spot color (and/or CMY components) is out of RGB color gamut.

CONCLUSION

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

The term "spot color" is used broadly herein. In some case spot color refers to a spot color pixel. In other cases, the term refers to a spot color area or image. Similarly, the term "paper product" includes paper, paper-fiber combinations, banknote paper materials, fabrics, cardboard, stock board, bond paper, copy paper, thermal paper, newspaper, etc., and various combinations of such.

Some of the embodiments discussed herein have been illustrated with reference to four ink intensities (S, C, M, Y). The present invention is not so limited. Of course, an image may include additional spot colors and/or processing inks. Also, different color spaces (e.g., RGB) may benefit from the inventive techniques. It will be appreciated that the term "pixel" is used generally throughout this document. Pixel can include an image area, a pixel, a block of pixels, etc.

To provide a comprehensive disclosure without unduly lengthening this specification, each of the above-mentioned patents and patent applications are hereby incorporated by reference, along with U.S. patent application Ser. No. 09/689,226, filed Oct. 11, 2000 (now U.S. Pat. No. 6,694,041). The particular combinations of elements and features in the above-detailed embodiments are exemplary only; the interchanging and substitution of these teachings with other teachings in this application and the incorporated-by-reference patents/applications are expressly contemplated.

The above-described methods, inventive spot color watermarks and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Data structures representing the various luminance values, methods, embedded images, spot color signals, data signals, luminance values, etc., may also be stored on such computer readable media. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of digital watermarking a spot color comprising:
provides a first multicolor approximation of the spot color;
based at least in part on the first multicolor approximation, providing multicolor components including a digital watermark signal; and
combining a percentage of the spot color with the multicolor components.

2. The method according to claim 1, wherein the first multicolor approximation comprises cyan, magenta and yellow components.

3. The method according to claim 2, wherein the multicolor components comprise cyan, magenta and yellow components.

4. The method according to claim 3, wherein the percentage of the spot color comprising a halftone screening of the spot color.

5. The method according to claim 4, wherein said combining step comprises a halftone screening process.

6. The method according to claim 1, further comprising providing an initial multicolor approximation, prior to the first multicolor approximation, wherein said first multicolor approximation is provided from the initial multicolor approximation.

7. The method according to claim 6, wherein said initial multicolor approximation comprises cyan, magenta, yellow and black components.

8. The method according to claim 7, wherein said first multicolor approximation comprises cyan, magenta and yellow components.

9. The method according to claim 8, wherein the percentage of the spot color comprises halftone screening of the spot color.

10. The method according to claim 9, wherein said combining comprises halftone screening.

11. The method according to claim 1, further comprising printing the combined spot color percentage and the multicolor components.

12. A digital watermarking method comprising:
screening a spot color; and
combining the screened spot color with multicolor components, wherein the multicolor components comprise at least cyan, magenta, and yellow, and wherein the multicolor components include hidden data.

13. The method according to claim 12, wherein said combining comprises halftone screening.

14. The method according to claim 12, further comprising determining a percentage level for screening of the spot color.

15. The method according to claim 14, wherein said determining comprises providing a fixed percentage for the spot color, and combining the fixed percentage for each pixel in an area comprising the spot color.

16. The method according to claim 14, wherein said determining comprises providing a percentage so as to render at least one of the multicolor components approximately zero.

17. The method according to claim 16, wherein the at least one multicolor component comprises zero.

18. A paper product comprising an image printed thereon, the printed image including a combination comprising a halftone-screening of a spot color ink, and at least cyan, magenta and yellow inks, wherein the cyan, magenta and yellow inks include a digital watermark signal.

19. A method of digital watermarking an image including a spot color comprising:
approximating the spot color with cyan, magenta and yellow components;
changing the cyan, magenta and yellow components to include a digital watermark;
combining the changed cyan, magenta and yellow components with a scaled spot color component; and
applying the combined components to a medium.

20. The method according to claim 19, wherein said approximating includes approximating the spot color with a black component.

21. The method according to claim 19, further comprising approximating the spot color with cyan, magenta, yellow and black components.

22. A method of embedding a spot color area comprising:
screening the spot color area to a percentage of its original intensity; and
modulating of a set of pixels within the spot color area to comprise a watermark signal, wherein the screened spot color area varies in intensity or luminance, and said modulating adapts modulation of the watermark signal according to localized areas of intensity or luminance resulting in the watermark signal varying across the spot color area; and
applying the spot color area to a medium.

23. The method according to claim 22, wherein the watermark signal comprises negative intensity adjustments and positive intensity adjustments.

24. The method according to claim 23, wherein the mean of a set comprising the negative intensity adjustments and the positive intensity adjustments comprises zero.

25. The method according to claim 23, wherein an average of the negative intensity adjustments is greater than an average of the positive intensity adjustments.

26. The method according to claim 23, wherein an average of the positive intensity adjustments is greater than an average of the negative intensity adjustments.

27. The method according to claim 22, wherein said modulating comprises modulating the set of pixels to a predetermined watermark signal level.

28. The method according to claim 22, wherein said modulating comprises modulating the set of pixels in a dynamic range.

* * * * *